US 10,406,947 B2

(12) United States Patent
Anderson et al.

(10) Patent No.: US 10,406,947 B2
(45) Date of Patent: Sep. 10, 2019

(54) CHILD RESTRAINT FOR VEHICLE (71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 207 days.

(21) Appl. No.: 15/686,764

(22) Filed: Aug. 25, 2017

(65) Prior Publication Data
US 2018/0056822 A1   Mar. 1, 2018

Related U.S. Application Data (60) Provisional application No. 62/379,519, filed on Aug. 25, 2016.

(51) Int. Cl.
*B60N 2/28* (2006.01)
(52) U.S. Cl.
CPC ........... *B60N 2/2806* (2013.01); *B60N 2/286* (2013.01); *B60N 2/2821* (2013.01); *B60N 2/2845* (2013.01); *B60N 2/2863* (2013.01)
(58) Field of Classification Search
CPC .. B60N 2/2806; B60N 2/2821; B60N 2/2845; B60N 2/2863; B60N 2/286
USPC .................................................... 297/256.16
See application file for complete search history.

(56) References Cited

U.S. PATENT DOCUMENTS

| 5,286,085 | A | 2/1994 | Minami |
| 5,836,650 | A | 11/1998 | Warner |
| 6,042,182 | A | 3/2000 | Geis |
| 6,152,528 | A | 11/2000 | van Montfort |
| 6,318,799 | B1 | 11/2001 | Greger |
| 6,367,875 | B1 | 4/2002 | Bapst |
| 6,508,510 | B2 | 1/2003 | Yamazaki |
| 6,540,293 | B1 | 4/2003 | Quackenbush |
| 6,705,676 | B1 | 3/2004 | Berringer |
| 6,834,915 | B2 | 12/2004 | Sedlack |
| 7,163,265 | B2 | 1/2007 | Adachi |
| 7,207,628 | B2 | 4/2007 | Eros |
| 7,216,932 | B2 | 5/2007 | Emmert |
| 7,246,855 | B2 | 7/2007 | Langmaid |
| 7,325,871 | B2 | 2/2008 | Gangadharan |
| 7,484,801 | B2 | 2/2009 | Kassai |
| 7,658,446 | B2 | 2/2010 | Meeker |
| 7,748,782 | B2 | 7/2010 | Chen |
| 7,828,381 | B2 | 11/2010 | Barger |

(Continued)

FOREIGN PATENT DOCUMENTS

| AU | 2006203692 | 3/2007 | |
| CA | 3007156 A1 * | 12/2018 | ........... B60N 2/2806 |

(Continued)

OTHER PUBLICATIONS

Britax, King Plus Product Manual, Mar. 2014, 87 pages, (no English version available).

*Primary Examiner* — Anthony D Barfield
(74) *Attorney, Agent, or Firm* — Barnes & Thornburg LLP (57) ABSTRACT

A child restraint includes a juvenile seat and a base for supporting the juvenile seat. The base is adapted to be anchored to lie in a stationary position on a passenger seat of a vehicle to support the juvenile seat in the vehicle.

23 Claims, 7 Drawing Sheets

(56) References Cited

U.S. PATENT DOCUMENTS

| | | |
|---|---|---|
| 7,887,129 B2 | 2/2011 | Hei |
| 7,926,874 B2 | 4/2011 | Hendry |
| 8,070,226 B2 | 12/2011 | Dingler |
| 8,123,295 B2 | 2/2012 | Hutchinson |
| 8,186,757 B2 | 5/2012 | Duncan |
| 8,262,161 B2 | 9/2012 | Fritz |
| 8,317,265 B2 | 11/2012 | Hutchinson |
| 8,353,559 B2 | 1/2013 | Williams |
| 8,474,907 B2 | 7/2013 | Weber |
| 8,544,952 B2 | 10/2013 | Keegan |
| 8,550,555 B2 | 10/2013 | Fritz |
| 8,556,344 B2 | 10/2013 | Williams |
| 8,596,718 B2 | 12/2013 | Gaudreau |
| 8,613,480 B1 | 12/2013 | Campbell |
| 8,845,022 B2 | 9/2014 | Strong |
| 9,156,379 B2 | 10/2015 | Williams |
| 9,365,135 B2 * | 6/2016 | Carpenter ............ B60N 2/2821 |
| 2013/0043706 A1 | 2/2013 | Gaudreau |
| 2013/0088057 A1 | 4/2013 | Szakelyhidi |
| 2014/0008955 A1 | 1/2014 | Spence |
| 2014/0062150 A1 | 3/2014 | Strong |
| 2014/0097653 A1 | 4/2014 | Chen |
| 2015/0115676 A1 | 4/2015 | Strong |
| 2017/0072819 A1 | 3/2017 | Anderson |

FOREIGN PATENT DOCUMENTS

| | | |
|---|---|---|
| CN | 201849345 U | 6/2011 |
| CN | 102336152 A | 2/2012 |
| CN | 102371919 A | 3/2012 |
| CN | 202608602 U | 12/2012 |
| CN | 202858539 U | 4/2013 |
| CN | 203254991 U | 10/2013 |
| CN | 203391644 U | 1/2014 |
| CN | 203438891 U | 2/2014 |
| CN | 203528326 U | 4/2014 |
| EP | 1077152 | 3/2006 |
| EP | 0822115 B2 | 5/2006 |
| EP | 1695864 | 8/2006 |
| EP | 2308715 | 4/2011 |
| EP | 2228253 | 2/2012 |
| GB | 2482061 B | 12/2013 |

* cited by examiner

CHILD RESTRAINT FOR VEHICLE

PRIORITY CLAIM

This application claims priority under 35 U.S.C. § 119(e) to U.S. Provisional Application No. 62/379,519, filed Aug. 25, 2016, which is expressly incorporated by reference herein.

BACKGROUND

The present disclosure relates to child restraints, and particularly to child restraints for use on passenger seats in vehicles. More particularly, the present disclosure relates to a child restraint including a juvenile seat and a seat support held in place on an underlying passenger seat by a passenger seat belt.

SUMMARY

A child restraint in accordance with the present disclosure includes a juvenile holder configured to hold a young child or infant. In illustrative embodiments, the juvenile holder includes a seat-support base adapted to set on a passenger seat in a vehicle and a juvenile seat configured to be mounted on the seat-support base after the seat-support base is anchored to the passenger seat using a vehicle seat belt associated with the passenger seat.

In illustrative embodiments, the seat-support base includes a foundation that is adapted to set on the passenger seat, a pivotable belt clamp, and a seat mount coupled to the pivotable belt clamp to pivot with and slide relative to the belt clamp and configured to mate with and support the juvenile seat. The belt clamp can be pivoted by a seat installer (caregiver) away from the foundation about a forward pivot axis that extends through a forward bottom end of the foundation to an opened belt-receiving position to expose a seat belt-receiver cavity formed in the foundation. The seat installer can then place portions of shoulder and lap straps included in the vehicle seat belt in the exposed seat belt-receiver cavity. Then the seat installer can pivot the belt clamp toward the foundation to a closed belt-trapping position and use a top-end clamp anchor that is carried on the belt clamp to lock the belt clamp to the foundation in the closed belt-trapping position to trap the seat belt portions in the seat belt-receiver cavity and tension the shoulder and lap straps included in the vehicle seat belt so that the seat-support base is anchored in a stationary position on the passenger seat. When the belt clamp is pivoted to the closed belt-trapping position, the seat mount that is coupled to the belt clamp is oriented in a suitable position under the juvenile seat to engage and support the juvenile seat in a stationary position relative to the seat-support base.

In illustrative embodiments, the seat-support base can remain in the anchored stationary position on the passenger seat and a caregiver can mount a juvenile seat on the underlying seat-support base when it is desired to transport a young child or infant in the vehicle and after the belt clamp has been pivoted to the closed belt-trapping position. In accordance with the present disclosure, the juvenile seat can be an infant carrier or a seat sized to carry an older child.

In illustrative embodiments, the seat-support base also includes a top-end clamp anchor that is coupled to a free upper end of the pivotable belt clamp to pivot therewith and configured to anchor the pivotable belt clamp to the top end of the foundation. The top-end clamp anchor is configured to mate with top end of the foundation when the belt clamp is pivoted to the closed belt-trapping position so that the belt clamp is blocked from pivotable movement relative to the foundation to the opened belt-receiving position. Normally, the top-end clamp anchor is hidden from view under the seat mount so that it cannot be seen by a bystander and can only be operated to unmate the pivotable belt clamp and the foundation to allow the seat installer can untrap the seat belt and remove it from the belt-receiver cavity formed in the foundation after the seat installer has released the seat mount from locking engagement with the underlying pivotable belt clamp and then moved the seat mount relative to the pivotable belt clamp to reveal and expose the top-end clamp anchor.

In illustrative embodiments, the seat mount is arranged to slide back and forth on top of the pivotable belt clamp from an anchor-hiding position that covers and hides the top-end clamp anchor to an anchor-access position that reveals and exposes the top-end clamp anchor so that it can be accessed and operated by a caregiver during removal of the seat-support base from the anchored stationary position on the passenger seat. Normally, the slidable seat mount is slid by the caregiver in a first direction toward a vehicle seat back to a retracted anchor-hiding position on the pivotable belt clamp to cover and hide the top-end clamp anchor from view. Alternatively, the slidable seat mount can be slid by the caregiver in an opposite second direction away from the vehicle seat back to an extended anchor-access position on the pivotable belt clamp to reveal and expose the top-end clamp anchor. In an illustrative embodiment, the seat mount is configured to slide back and forth along a curved path between the retracted anchor-hiding position and the extended anchor-access position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which:

FIG. 4 is an exploded perspective assembly view of the child restraint of FIGS. 1-3 showing that the child restraint includes a juvenile seat and a seat-support base and showing that the seat-support base includes (from left to right) an L-shaped foundation formed to include four strap-receiver channels, a pivotable belt clamp including a pivot rod and a curved belt-tensioner plate having a lower end adapted to be pivotably coupled to a forward bottom end of the L-shaped foundation using the pivot rod and a rearward upper end adapted to be coupled to the top-end clamp anchor, a curved slidable seat mount configured to mate for sliding movement along a curved path on the pivotable belt clamp to form a seat holder that is configured to be mated with a juvenile seat such as an infant carrier after the juvenile seat has been rotated 180° about the illustrated vertical axis to assume an installation orientation shown in FIGS. 2 and 3, and a top-end clamp anchor comprising separate first and second pivot blockers that are each configured to be mounted on the free upper end of the pivotable belt clamp for lateral movement relative to the pivotable belt clamp to engage and disengage opposing blocker (retainer pin) receivers formed in the top end of the L-shaped foundation and also showing that the L-shaped foundation includes a near first side wall formed to include a T-shaped first lower strap-receiver channel and an angled and inclined first upper strap-receiver channel and a far second side wall formed to include a T-shaped second lower strap-receiver channel and an angled and inclined second upper strap-receiver channel and further showing that the second side wall is arranged to lie in spaced-apart relation to the first side wall to define therebetween a seat belt-receiver cavity communicating with each of the four strap-receiver channels and sized to receive shoulder and lap portions of the vehicle seat belt therein as suggested in FIGS. 6 and 7;

FIGS. 5-7 show pivoting motion of the pivotable belt clamp and the curved seat mount carried on the pivotable belt clamp as a unit to apply tension to portions of the shoulder and lap straps of the vehicle seat belt that are placed in the seat belt-receiver cavity formed in the L-shaped foundation by a seat installer (caregiver) during installation of the seat-support base on a vehicle passenger seat;

DETAILED DESCRIPTION

Figures 1, 2, 3:
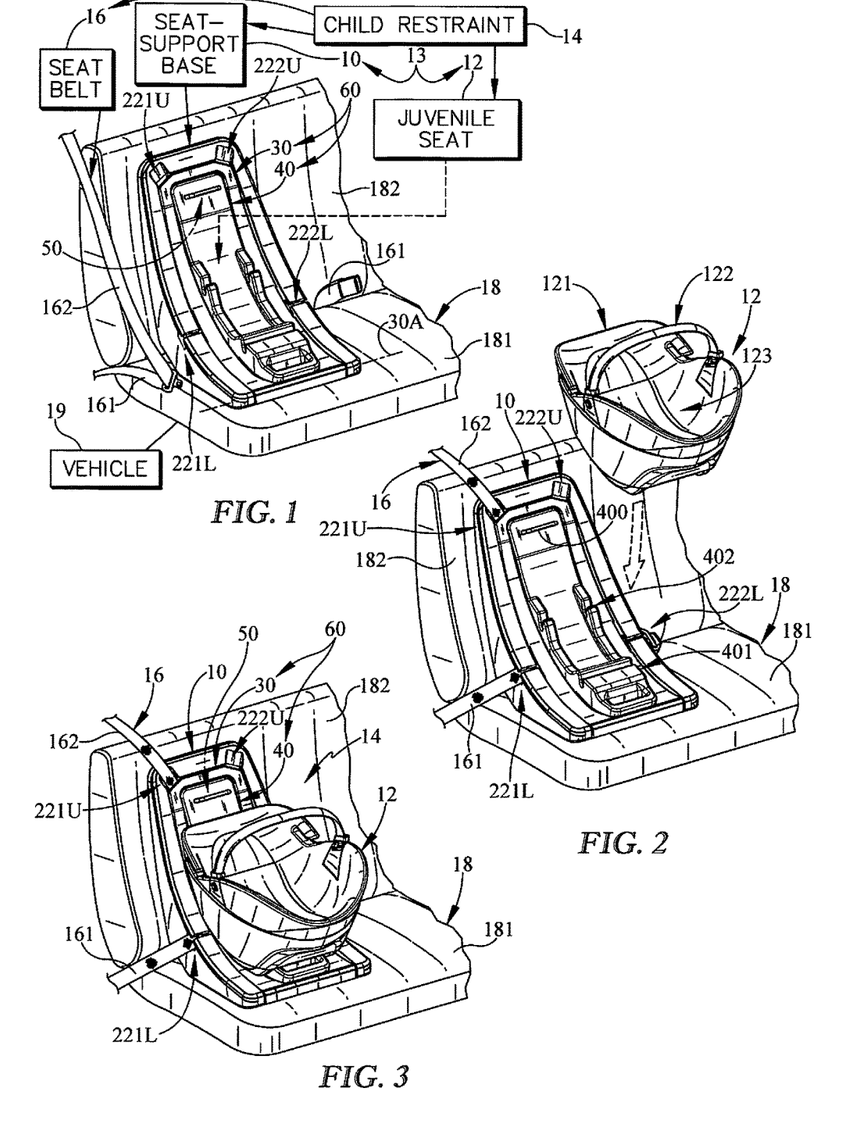
FIG. 1 is a perspective view of a seat-support base included in a child restraint in accordance with the present disclosure along with a diagrammatic view of a juvenile seat that is adapted to be mounted on the seat-support base and showing the seat-support base at rest on a vehicle passenger seat before a nearby vehicle seat belt associated with the vehicle passenger seat is mated with the seat-support base in accordance with the present disclosure and as suggested in the belt-installation sequence shown in FIGS. 5-7 to hold the seat-support base in a stationary position on the vehicle passenger seat ready to receive a juvenile seat as suggested in FIGS. 2 and 3.
FIG. 2 is a view similar to FIG. 1 after the vehicle seat belt has been mated to the seat-support base to hold the seat-support base in a stationary position on the vehicle passenger seat and before the juvenile seat has been mounted on the seat-support base and suggesting that the juvenile seat is an infant carrier.
FIG. 3 is a view similar to FIGS. 1 and 2 after the juvenile seat (infant carrier) has been mounted on the underlying seat-support base.

A seat-support base 10 in accordance with the present disclosure cooperates with a juvenile seat 12 and vehicle seat belt 16 to form a child restraint 14 as shown, for example, in FIGS. 1-3. Seat-support base 10 can be anchored in accordance with the present disclosure to a passenger seat 18 in a vehicle 19 by a caregiver using any suitable means such as a vehicle seat belt 16 having a lap strap 161 and a shoulder strap 162 as suggested in FIGS. 2 and 5-7. Seat-support base 10 can be opened by a caregiver to expose a seat belt-receiver cavity 16C as suggested in FIGS. 10-12 so that the caregiver can trap portions of vehicle seat belt 16 in seat belt-receiver cavity 16C to tension lap and shoulder straps 161, 162 of vehicle seat belt 16 as suggested in FIGS. 6A-8A.

Figure 4:
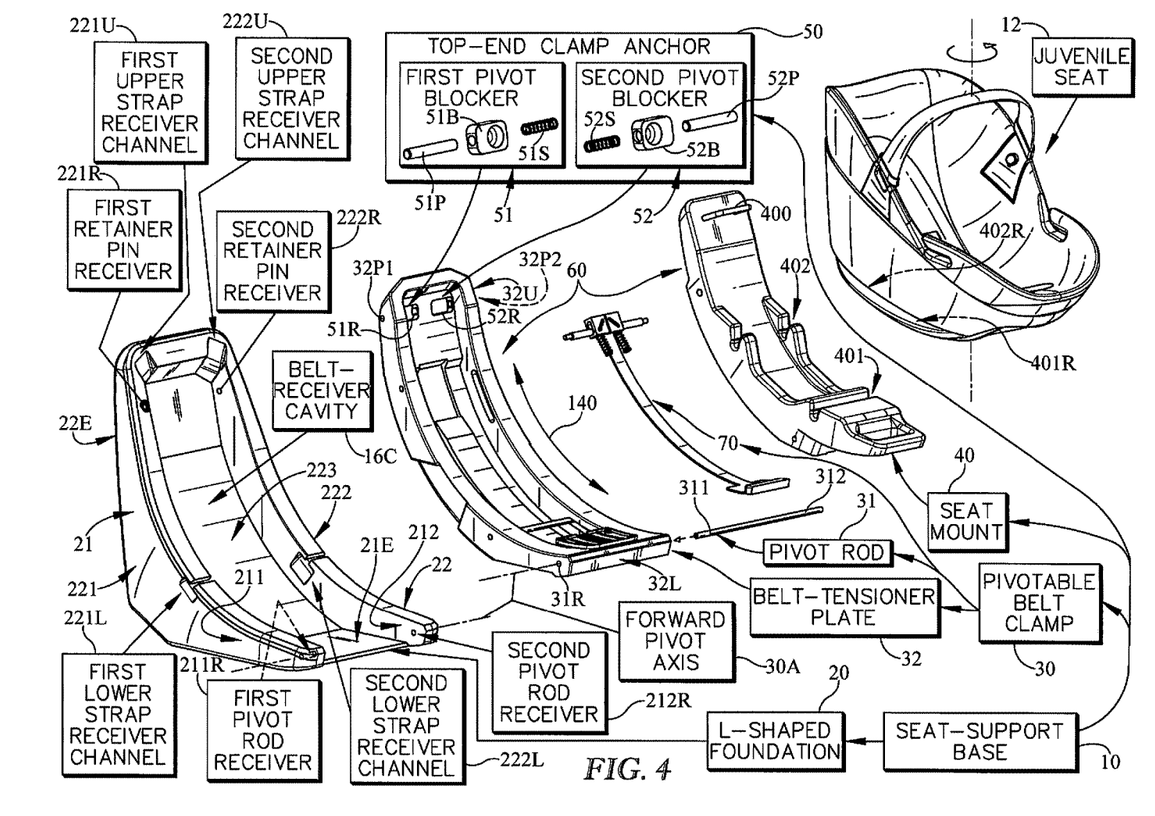

In illustrative embodiments, juvenile seat 12 is an infant carrier including a seat bucket 121 and a carry handle 122 that is coupled to seat bucket 121 and arranged normally to lie above an infant-receiving space 123 formed in seat bucket 121 as suggested in FIGS. 2-4. In alternative embodiments, juvenile seat 12 is an upright seat for an older child.

Seat-support base 10 includes an L-shaped foundation 20 coupled to pivotable belt clamp 30 and adapted to set on passenger seat 18, a pivotable belt clamp 30, and a curved seat mount 40 adapted to mate with juvenile seat 12 as suggested in FIGS. 1 and 4. Pivotable belt clamp 30 and curved seat mount 40 cooperate to form a seat holder 60 that is configured to pivot about forward pivot axis 30A as a unit as suggested in FIGS. 5-7 and is configured to mate with juvenile seat 12 when pivotable belt clamp 30 is placed and locked in a closed belt-trapping position as suggested in FIGS. 2 and 3.

Figures 5, 6, 7:
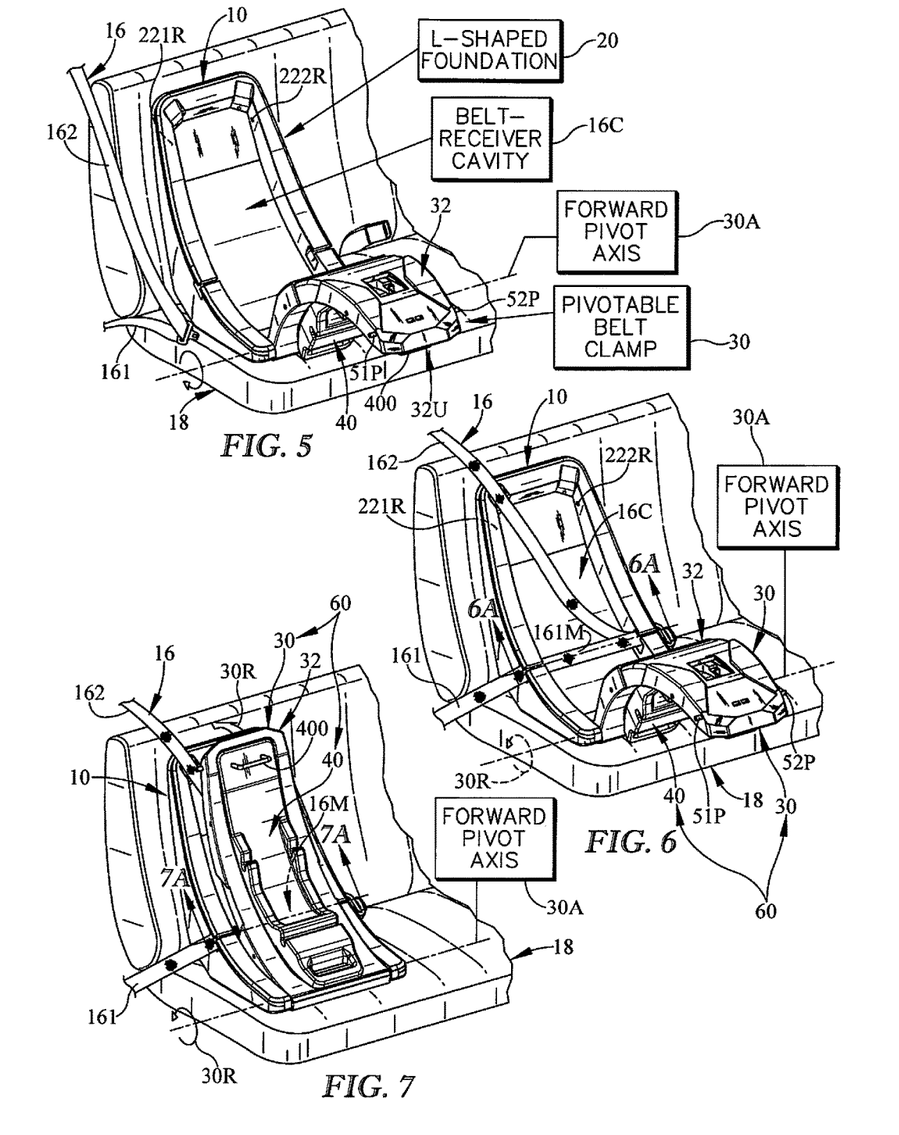
FIG. 5 is a perspective view similar to FIG. 1 showing that the seat belt-receiver cavity formed in the L-shaped foundation is opened in response to forward and upward pivoting movement of the pivotable belt clamp in a clockwise direction about a forward pivot axis extending through a forward bottom end of the L-shaped foundation in a clockwise direction to an opened position and showing portions of the shoulder and first lap strap on the left side of the L-shaped foundation and a portion of the second lap strap on the right side of the L-shaped foundation before those portions are placed in the seat belt-receiver cavity formed in the L-shaped foundation.
FIG. 6 is a view similar to FIG. 5 after portions of the vehicle seat belt have been placed in the seat belt-receiver cavity formed in the L-shaped foundation to lie under the opened belt clamp and showing that those portions have been arranged to cause the first lap strap to pass through the T-shaped first lower strap-receiver channel and the first shoulder strap to pass through the angled and inclined first upper strap-receiver channel and to cause the second lap strap to pass through the T-shaped second lower strap-receiver channel.
FIG. 7 is a view similar to FIGS. 5 and 6 showing rearward and downward pivoting motion of the pivotable belt clamp about the forward pivot axis in a counterclockwise direction toward a closed direction to engage the shoulder and lap strap portions in the seat belt-receiver cavity formed in the L-shaped foundation to increase tension in the vehicle seat belt to anchor the L-shaped foundation in a stationary position on the vehicle passenger seat.
Figure 6A:
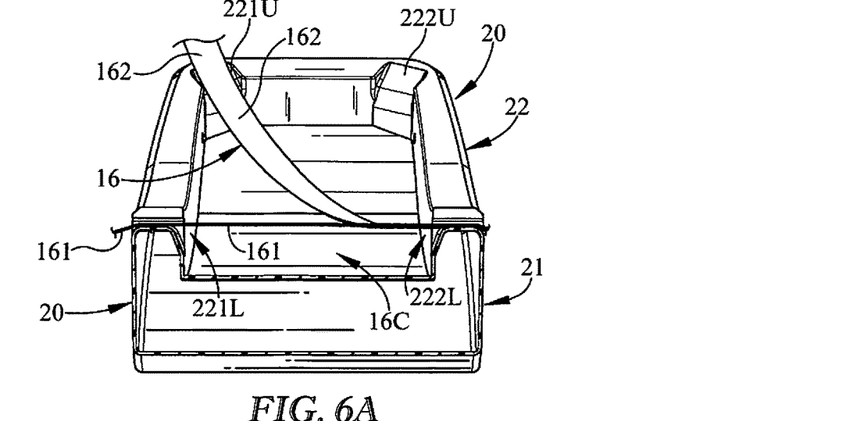
FIG. 6A is a section taken along line 6A-6A of FIG. 6 showing an untensioned vehicle seat belt.
Figure 7A:
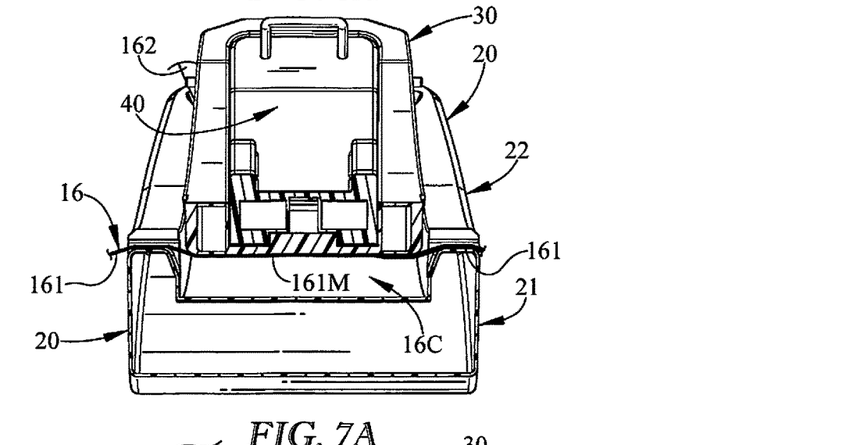
FIG. 7A is a section taken along line 7A-7A of FIG. 7 showing a partly tensioned vehicle seat belt.

Pivotable belt clamp 30 is configured to be pivoted relative to L-shaped foundation 20 about a forward pivot axis 30A during a base-anchoring process between an opened belt-receiving position shown in FIGS. 5 and 6 and a closed belt-trapping position shown in FIG. 2. Once the pivotable belt clamp 30 has been opened as suggested in FIGS. 5 and 12, a caregiver can place portions of vehicle seat belt 16 in a seat belt-receiver-cavity 16C formed in L-shaped foundation 20 and then pivot the pivotable belt clamp 30 about forward pivot axis 30A in a rearward direction 30R toward the closed belt-trapping position as suggested in FIG. 7. When pivotable belt clamp 30 arrives at the closed belt-trapping position as shown in FIG. 2, a top-end clamp anchor 50 included in seat-support base 10 and coupled to pivotable belt clamp 30 as suggested diagrammatically in FIG. 4 engages a top end 22E of L-shaped foundation 20 as suggested in FIGS. 3 and 4 to retain pivotable belt clamp 30 in the closed belt-trapping position so that seat-support base 10 is retained in a stationary position on passenger seat 18 as suggested in FIGS. 3, 7, and 8.

L-shaped foundation 20 of seat-support base 10 is shown, for example, in FIG. 4. Foundation 20 generally is L-shaped although it is within the scope of the present disclosure to vary the shape of foundation 20 as needed to adapt to an underlying vehicle passenger seat or other base-support platform and/or to adapt to a desired juvenile seat. Foundation 20 includes a forwardly extending bottom 20 adapted to mate with a seat bottom 181 of vehicle passenger seat 18 and an upwardly extending back 22 adapted to mate with a seat back 182 of vehicle passenger seat 18 as suggested in FIG. 8. Bottom 21 includes a forward bottom end 21E associated with forward pivot axis 30A as suggested in FIGS. 4 and 8. Back 22 includes a rearward top end 22E that is adapted to be coupled to the top-end anchor clamp 50 that is coupled to the pivotable belt clamp 30 of seat holder 60 to move therewith as suggested in FIGS. 4 and 8.

Bottom 21 of L-shaped foundation 20 is formed to include first and second pivot-rod receivers 211, 212 as suggested in FIG. 4. A pivot rod 31 included in pivotable belt clamp 30 has a first end 311 that is arranged to extend into first pivot-rod receiver 211R formed in a first side wall 211 of lower bottom end 21E of bottom 21 and an opposite second end 312 that is arranged to extend into second pivot-rod receiver 212R. Pivot rod 31 is arranged to extend horizontally between first and second side walls 221, 222 and establish forward pivot axis 30A as suggested in FIGS. 4 and 8.

Figures 10, 11, 12:
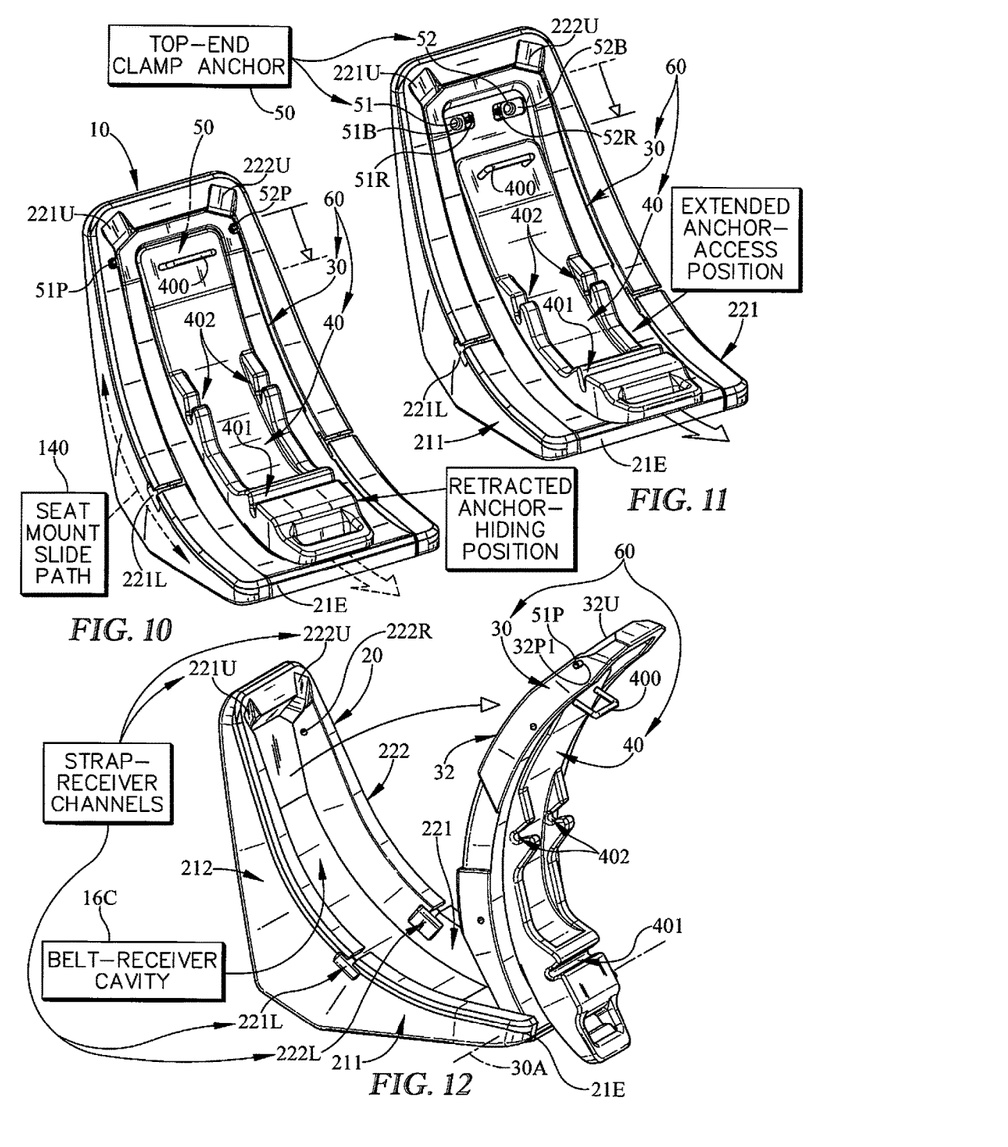
FIG. 10 is a perspective view of the seat-support base of FIG. 1, with portions broken away to show the positions of the first and second slide-blocker pins included in the slidable seat mount arranged to extend into companion upper pin-retainer apertures formed in the pivotable belt clamp to block sliding movement of the slidable seat mount on the pivotable belt clamp along a curved path and retain the slidable seat mount in the retracted anchor-hiding position on the pivotable belt clamp and showing diagrammatically the curved motion path of the slidable curved seat mount.
FIG. 11 is a perspective view similar to FIG. 10 showing that the curved seat mount has been released from locking engagement with the underlying pivotable belt clamp and then slid to the extended anchor-access position to reveal and expose the top-end clamp anchor.
FIG. 12 is a view similar to FIG. 11 showing pivotable movement of the pivotable belt clamp about a forward pivot axis relative to the foundation to open the seat belt-receiver cavity after actuation by a caregiver of the revealed and exposed top-end clamp anchor to free the pivotable belt clamp to be pivoted about the forward pivot axis.

Back 22 of L-shaped foundation 20 is formed to include four strap-receiver channels 221L, 221U, 222L, and 222U and a seat belt-receiver cavity 16C as shown, for example, in FIGS. 1, 4, and 12. In illustrative embodiments, back 22 includes a near first side wall 221 aligned with first side wall 211 of bottom 21 and formed to include first lower strap-receiver channel 221L and a first upper strap-receiver channel 221U as shown in FIG. 4. Back 22 also includes a far second side wall 222 aligned with first side wall 212 of bottom 21 and formed to include second lower strap-receiver channel 222L and a second upper strap-receiver channel 222U as shown in FIG. 4. Each of first and second lower strap-receiver channels 221L, 222L is T-shaped in illustrative embodiments as suggested in FIGS. 4, 8, and 12. Each of first and second upper strap-receiver channels 221U, 222U is inclined (relative to the vertical) as suggested in FIG. 8 and they are angled and cooperate to form an acute angle Θ therebetween as also suggested in FIG. 8. Seat belt-receiver cavity 16C is formed between first and second side walls 221, 222 and bounded, in part, by a laterally extending panel 223 as shown, for example, in FIG. 4.

Figure 8:
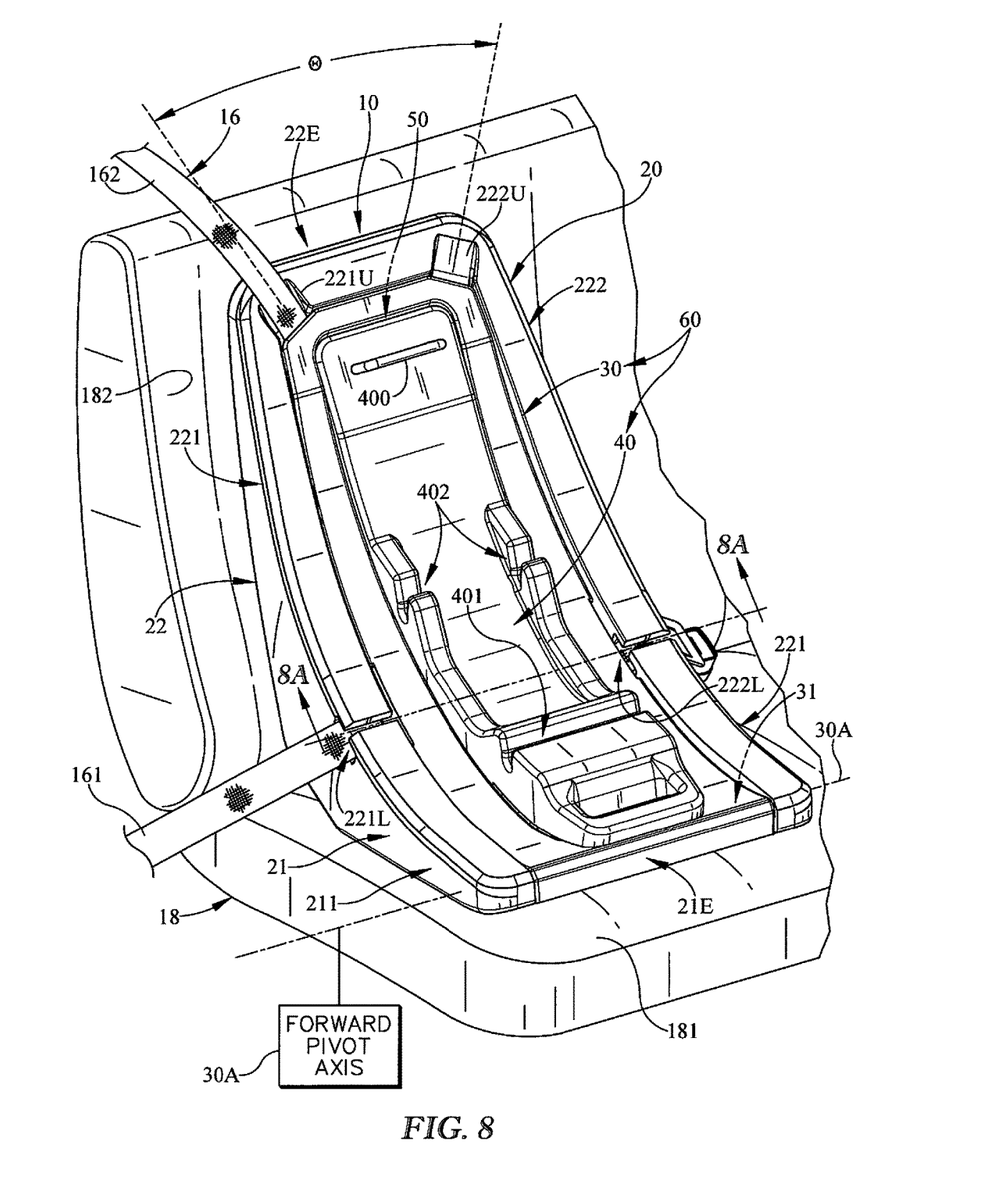
FIG. 8 is a view similar to FIGS. 6 and 7 showing further rearward and downward pivoting motion of the pivotable belt clamp about the forward pivot axis to a closed belt-trapping position to increase tension in the vehicle seat belt further.
Figure 8A:
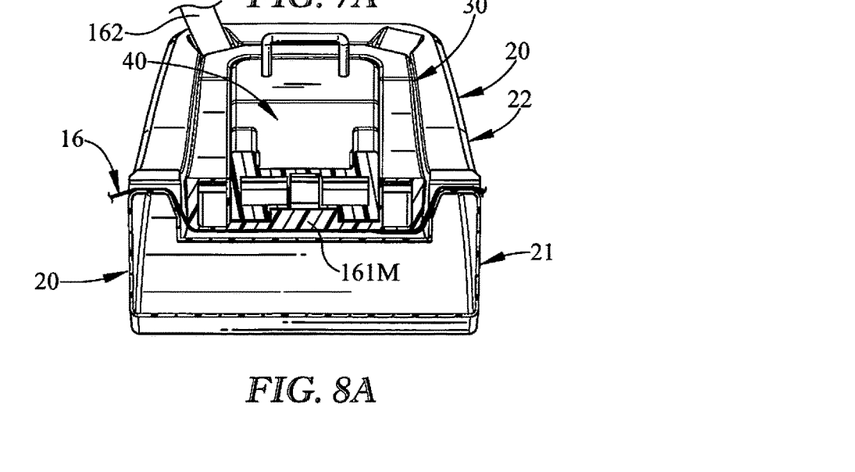
FIG. 8A is a section taken along line 8A-8A of FIG. 8 showing a fully tensioned vehicle seat belt.
Figure 9:
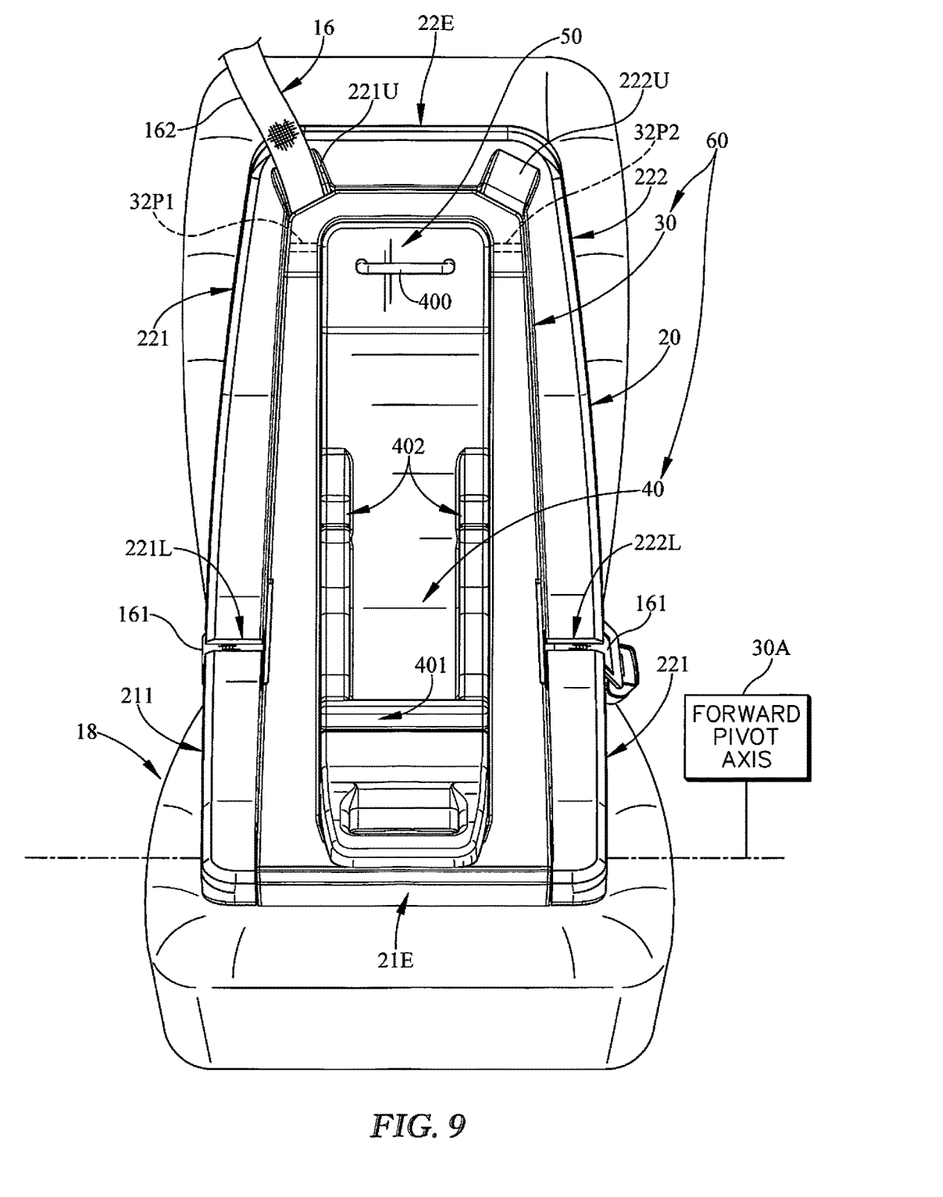
FIG. 9 is a front perspective view of the seat-support base of FIG. 8 held in a stationary position on a passenger seat of a vehicle.

Upper portions of first and second side walls 221, 222 of back 22 at the rearward top end 22E of L-shaped foundation 20 are formed to mate with top-end clamp anchor 50 when pivotable belt clamp 30 is pivoted in a rearward direction about forward pivot axis 30A to assume the closed belt-trapping position as suggested in FIGS. 4 and 8. First side wall 221 is formed to include first retainer-pin receiver 221R to receive a retainer pin 51P of a first pivot blocker 51 included in top-end clamp anchor 50 as suggested in FIG. 4. Second side wall 222 is formed to include second retainer-pin receiver 222R to receive a retainer pin 52P of a second pivot blocker 52 included in the top-end clamp anchor 50 as suggested in FIG. 4.

Top-end clamp anchor 50 is coupled to pivotable belt clamp 30 as suggested in FIG. 4 and covered by slidable seat mount 40 so that it is hidden from view as suggested in FIG. 10. Seat mount 40 is configured to slide back and forth relative to the underlying pivotable belt clamp 30 (once released from locking engagement with pivotable belt clamp 30) from a retracted anchor-hiding position shown in FIG. 10 to an extended anchor-access position shown in FIG. 11 so that a caregiver can access and operate top-end clamp anchor 50 to release the pivotable belt clamp 30 from locking engagement with the underlying foundation 20 so it can pivot forwardly about forward pivot axis 30A as suggested in FIG. 12.

Pivotable belt clamp 30 includes pivot rod 31 and a belt-tensioner plate 32 as shown, for example, in FIG. 4. Pivot rod 31 passes through one or more pivot rod receivers 31R formed in a lower end 32L of belt-tensioner plate 32 to support belt-tensioner plate 32 for pivotable movement about forward pivot axis 30A toward and away from back 22 of L-shaped foundation 20 as suggested in FIGS. 5-7. Belt-tensioner plate 32 is sized to fit relatively snugly in seat belt-receiver cavity 16C formed in L-shaped foundation 20 when pivotable belt clamp 30 is pivoted to its closed belt-trapping position shown, for example, FIGS. 2 and 5-8. An upper end 32U of belt-tensioner plate 32 is formed to provide means for carrying each of the first and second pivot blockers 51, 52 of top-end clamp anchor 50 as suggested in FIGS. 4 and 11. The upper end 32U of belt-tensioner plate 32 is formed to include pin receivers 51R, 52R through which retainer pins 51P, 52P pass to extend into pin receivers 221R, 222R formed in side walls 221, 222 of back 22 of L-shaped foundation 20.

Seat mount 40 is coupled to belt-tensioner plate 32 to pivot therewith about forward pivot axis 30A as suggested in FIGS. 4 and 5-7. Seat mount 40 and belt-tensioner plate 32 of pivotable belt clamp 30 cooperate to form a seat holder 60 that is configured to be mate with juvenile seat 12 as suggested in FIGS. 2 and 3 after pivotable belt clamp 30 has been pivoted rearwardly about forward pivot axis 30A to assume the closed belt-trapping position as suggested in FIGS. 6 and 7.

Seat mount 40 is curved in illustrative embodiments as shown, for example, in FIG. 4 so that it can move relative to belt-tensioner plate 32 of pivotable belt clamp 30 back and forth along a curved path 140 as suggested in FIGS. 10 and 11 at the option of a caregiver to change the orientation of seat mount 40 (and therefore the orientation of a juvenile seat 12 coupled to seat mount 40) relative to L-shaped foundation 20. A mount lock 70 is also included in pivotable belt clamp 30 as suggested in FIG. 4 and is configured to provide means for controlling movement of seat mount 40 relative to belt-tensioner plate 30 to establish a desired orientation of seat mount 40 relative to L-shaped foundation 20.

Seat mount 40 is arranged to slide back and forth along curved belt path 140 on pivotable belt clamp 30 from a retracted anchor-hiding position shown in FIG. 10 to an extended anchor-access position shown in FIG. 11 at the option of a caregiver using the spring-loaded mount lock 70. Top-end clamp anchor 50 is revealed and exposed so that it can be accessed and operated by a caregiver when seat mount 40 is slid on pivotable belt clamp 30 to the extended anchor-access position as shown in FIG. 11.

Top-end clamp anchor 50 comprises spring-loaded first and second pivot blockers 51, 52 as shown, for example, in FIG. 4. These pivot blockers 51, 52 are used to block pivotable movement of pivotable belt clamp 30 about forward pivot axis 30A relative to foundation 20 to retain pivotable belt clamp 30 normally in the closed belt-trapping position as shown, for example, in FIGS. 2, 3, 8, 8A, and 9-11.

First pivot blocker 51 of top-end clamp anchor 50 comprises a first base 51B sized to fit in a first base receiver 51R formed in upper end 32U of belt-tensioner plate 32 of pivotable belt clamp 30, first retainer pin 51P, and first pin-biasing spring 51S as shown in FIG. 4. First spring 51S is arranged in first base 51B to yieldably urge first retainer pin 51P normally to engage first retainer pin receiver 221R formed in foundation 20 when pivotable belt clamp 30 assumes the closed belt-trapping position to retain belt clamp 30 in that position.

Second pivot blocker 52 of top-end clamp anchor 50 comprises a second base 52B sized to fit in a second base receiver 52R formed in upper end 32U of belt-tensioner plate 32 of pivotable belt clamp 30, second retainer pin 52P, and second pin-biasing spring 52S as shown in FIG. 4. Second spring 52S is arranged in second base 52B to yieldably urge second retainer pin 52P normally to engage second retainer pin receiver 222R formed in foundation 20 when pivotable belt clamp 30 assumes the closed belt-trapping position to retain belt clamp 30 in that position.

A caregiver can apply a squeezing force to first and second bases 51B, 52B to release top-end clamp anchor 50 from engagement with foundation 20 after seat mount 40 has been slid to the extended clamp-access position shown in FIG. 11 to expose and reveal pivot blockers 51, 52 of top-end clamp anchor 50. Application of such a squeezing force causes bases 51B, 52B to slide relative to belt-tensioner plate 32 and move toward one another to compress springs 51S, 52S and withdraw first retainer pin 51P from the companion first retainer pin receiver 221R also and withdraw second retainer pin 52P from the companion second retainer pin receiver 222R so that pivotable belt clamp 30 is released (unlocked) to free pivotable belt clamp 30 to be pivoted forwardly about forward pivot axis 30A by the caregiver as suggested in FIG. 12.

Seat mount 40 is formed to include a pull handle 400 that can be gripped and used by a caregiver once top-end clamp anchor 50 is released to cause seat holder 60 to pivot about forward pivot axis 30A so that pivotable belt clamp 30 can be pivoted by a caregiver easily between the closed belt-trapping position shown in FIG. 2 and the opened belt-receiving position shown in FIGS. 5 and 6. Seat mount 40 also includes a first rod retainer 401 for receiving and mating with a first retainer rod 401R included on the underside of juvenile seat 12 and a companion second rod retainer 402 for receiving and mating with a second retainer rod 402R included on the underside of juvenile seat 12 as suggested in FIGS. 4 and 8. Second rod retainer 402 is arranged to lie between pull handle 400 and first rod retainer 401.

A child restraint 14 in accordance with the present disclosure includes a seat-support base 10 adapted to set on a passenger seat 18 in a vehicle 19 and a juvenile seat 12 as suggested in FIG. 1. Juvenile seat 12 is configured to be mounted on seat-support base 10 after seat-support base 10 is anchored to passenger seat 18 using a vehicle seat belt 16 associated with passenger seat 18 as suggested in FIGS. 1 and 2.

Seat-support base 10 includes a foundation 20 that is adapted to set on passenger seat 18, a pivotable belt clamp 30, and a seat mount 40 coupled to the pivotable belt clamp 30 to pivot with the belt clamp 30 and configured to mate with juvenile seat 12 as suggested in FIGS. 1-4. Belt clamp 30 can be pivoted by a seat installer about a forward pivot axis 30A away from the foundation 20 as suggested in FIGS. 5 and 12 (after belt clamp 30 has been unlocked as suggested in FIGS. 10 and 11) to an opened belt-receiving position to expose a seat belt-receiver cavity 16C formed in foundation 20. The seat installer can then place portions of shoulder and lap straps 162, 161 included in vehicle seat belt 16 in the exposed seat belt-receiver cavity 16C as suggested in FIG. 6. Then the seat installer can pivot the belt clamp 30 toward the foundation 20 to a closed belt-trapping position as shown in FIGS. 7 and 2 (where belt clamp 30 is locked in place by top-end clamp anchor 50) to trap the seat belt portions in the seat belt-receiver cavity 16C and tension the shoulder and lap straps 162, 161 included in the vehicle seat belt 16 so that seat-support base 10 is anchored in a stationary position on the passenger seat 18. When the belt clamp 30 is pivoted to the closed belt-trapping position as suggested in FIG. 2, the seat mount 40 that is coupled to the belt clamp 30 is oriented in a suitable position to engage and support the juvenile seat 12 in a stationary position relative to the seat-support base 10 as suggested in FIGS. 2 and 3.

Seat-support base 10 can remain in the anchored stationary position on the passenger seat 18 and a caregiver can mount a juvenile seat 12 on seat-support base 10 when it is desired to transport a young child or infant in the vehicle and after the belt clamp 30 has been pivoted to the closed belt-trapping position. In accordance with the present disclosure, the juvenile seat 12 can be an infant carrier as suggested in FIGS. 2 and 3 or a seat sized to carry an older child.

A child restraint 14 comprises a juvenile holder 13 including a seat-support base 10 and a juvenile seat 12 as shown in FIG. 1. Juvenile seat 12 is configured to the mounted on seat-support base 10 as suggested in FIGS. 1-3.

Seat-support base 10 includes a foundation 20 adapted to set on a passenger seat 18 in a vehicle 19, a pivotable belt clamp 30, a top-end clamp anchor 50, and a seat mount 40 as suggested in FIGS. 3 and 4. Juvenile seat 12 is configured to be supported on seat mount 40 as suggested diagrammatically in FIG. 1 and illustratively in FIG. 3.

Pivotable belt clamp 30 is mounted on foundation 20 for movement about a forward pivot axis 30A associated with a forward bottom end 21E of foundation 20 from a closed belt-trapping position shown in FIG. 1 in a direction away from a rearward top end 22E of foundation 20 to an opened belt-receiving position shown in FIG. 6 to expose a seat belt-receiver cavity 16C formed in foundation 20. Lap and shoulder straps 161, 162 of vehicle seat belt 16 can be inserted into or removed from seat belt-receiver cavity 16C by a caregiver when cavity 16C is exposed as shown in FIG. 6.

Top-end clamp anchor 50 is coupled to pivotable belt clamp 30 to pivot therewith about forward pivot axis 30A as suggested in FIGS. 5-7. Top-end clamp anchor 50 is configured to lock pivotable belt clamp 30 to foundation 20 to retain pivotable belt clamp 30 in the closed belt-trapping position as shown in FIGS. 2 and 3 to trap portions of shoulder and lap straps 161, 162 of a vehicle seat belt 16 that has been placed in seat belt-receiver cavity 16C formed in foundation 20 to tension the shoulder and lap straps 161, 162 included in vehicle seat belt 16 so that seat-support base 10 is anchored in a stationary position on passenger seat 18.

Seat mount 40 is coupled to pivotable belt clamp 30 to move therewith as shown in FIGS. 5-7 and 12. Seat mount 40 is oriented to engage and support juvenile seat 12 in a stationary juvenile-seating position relative to seat-support base 10 upon pivotable movement of pivotable belt clamp 30 to the closed belt-trapping position as suggested in FIGS. 2 and 3.

Seat mount 40 is arranged to slide back and forth on the top of pivotable belt clamp 30 as suggested in FIGS. 10 and 11 from a retracted anchor-hiding position shown in FIG. 10 in which top-end clamp anchor 50 is hidden from view in a space provided between pivotable belt clamp 30 and seat mount 40 to an extended anchor-access position shown in FIG. 11 that reveals and exposes top-end clamp anchor 50 so that it can be accessed and operated by a caregiver during removal of seat-support base 10 from an anchored stationary position on a passenger seat 18 of a vehicle 19. Seat mount 40 is configured to slide along a curved path 140 relative to pivotable belt clamp 30 between the retracted anchor-hiding position and the extended anchor-access position as suggested in FIGS. 10 and 11.

Top-end clamp anchor 50 comprises a first pivot blocker 51B mounted on a free upper end 32U of pivotable belt clamp 30 as suggested in FIGS. 4 and 11 for lateral movement relative to pivotable belt clamp 30 to engage and disengage a companion blocker receiver 51R formed in the rearward top end 22E of foundation 20. First pivot blocker 51 includes a first retainer pin 51P mounted to move laterally back and forth in a first pin-receiver passageway 32P1 formed in the free upper end 32U of pivotable belt clamp 30 and arranged to lie in side-by-side communication with the companion blocker receiver 51R formed in the rearward top end 22E of foundation 20 when pivotable belt clamp 30 occupies the closed belt-trapping position. First pivot blocker 51 also includes a first pin-biasing spring 51S arranged to move first retainer pin 51P in pin-receiver passageway 32P1 (See FIGS. 4 and 9) of pivotable belt clamp 30 to extend into the companion blocker receiver 51R of foundation 20 as suggested in FIGS. 4 and 10 to retain pivotable belt clamp 30 in the closed belt-trapping position on foundation 20. Pivotable belt clamp 30 also includes a second pin-passageway 32P2 for receiving second retainer pin 52P as suggested in FIGS. 4 and 9.

Pivotable belt clamp 30 includes a belt-tensioner plate 32 and a pivot rod 31 coupled to belt-tensioner plate 32 and to the forward bottom end 21E of foundation 20 to support belt-tensioner plate 32 for pivotable movement about the forward pivot axis 30A during movement of pivotable belt clamp 30 between the closed belt-trapping position and the opened belt-releasing position as suggested in FIGS. 4, 10, and 12. Pivotable belt clamp 30 also includes a spring-loaded mount lock 70 coupled to an underside of seat mount 40 to move therewith. Spring-loaded mount lock 70 is configured to provide means for engaging belt-tensioner plate 32 to retain seat mount 40 in the retracted anchor-hiding position and for alternatively disengaging belt-tensioner plate 32 to free seat mount 40 to be moved relative to belt-tensioner plate 32 from the retracted anchor-hiding position shown in FIG. 10 to the extended anchor-access position shown in FIG. 11.

Pivotable belt clamp 30 and seat mount 40 cooperate to form a seat holder 60 that is configured to pivot about the forward pivot axis 30A as suggested in FIGS. 4 and 5-7. Seat mount 40 includes a pull handle 400 that is configured to be gripped and pulled by a caregiver to cause seat holder 60 to pivot about the forward pivot axis 30A when top-end clamp anchor 50 is disengaged from foundation 20 and during movement of pivotable belt clamp 30 to the opened belt-receiving position.

Foundation 20 is L-shaped and configured to include (1) a forwardly extending bottom 21 that is formed to include a lower portion of seat belt-receiver cavity 16C and is adapted to set on a vehicle seat bottom 181 as supported in FIG. 1 and (2) an upwardly extending back 22 that is coupled to a rear portion of the forwardly extending bottom 21 and formed to include an upper portion of seat belt-receiver cavity 16C and adapted to mate with a vehicle seat back 182 as suggested in FIG. 1. The forwardly extending bottom 21 includes the forward bottom end 121E that is associated with forward pivot axis 30A. The upwardly extending back 22 includes a rearward top end 22E that is arranged to mate with top-end clamp anchor 50 to retain pivotable belt clamp 30 in the closed belt-trapping position.

The forwardly extending bottom 21 is formed to include laterally spaced-apart opposing first and second pivot-rod receivers 211R, 212R as shown in FIG. 4. Pivotable belt clamp 30 includes a pivot rod 31 arranged to extend laterally along the forward pivot axis 30A and formed to include a first end 311 arranged to extend into the first pivot-rod receiver 211R and an opposite second end 212 arranged to extend into the second pivot-rod receiver 212R.

The forwardly extending bottom 21 of foundation 20 includes a first side wall 211 arranged to extend toward the upwardly extending back 22 and a second side wall 212 arranged to extend toward the upwardly extending back 22. Second side wall 212 is arranged lie in laterally spaced-apart relation to the first side wall 211 to define therebetween the lower portion of the seat belt-receiver cavity 16C to receive a lower portion of pivotable belt clamp 30 therein when pivotable belt clamp 30 occupies the closed belt-trapping position. First side wall 211 is formed to include the first pivot-rod receiver 211R. Second side wall 212 is formed to include the second pivot-rod receiver 212R.

The upwardly extending back 22 of foundation 20 includes first and second side walls 221, 222 arranged to lie in laterally spaced-apart relation to one another as shown in FIG. 4. These side walls 221, 222 define therebetween the upper portion of seat belt-receiver cavity 16C to receive an upper portion of pivotable belt clamp 30 therein, and to receive therein portions of shoulder and lap straps 162, 161 of a vehicle seat belt 16 in a space provided between foundation 20 and pivotable belt clamp 30 when pivotable belt clamp 30 occupies the closed belt-trapping position.

First side wall 221 of the upwardly extending back 22 of foundation 20 includes first lower strap-receiver channel means 211L for receiving a first portion of the lap strap 161 of the vehicle seat belt 16 as suggested in FIGS. 2 and 6. Second side wall 222 of the upwardly extending back 22 of foundation includes second lower strap-receiver channel means 222L for receiving a second portion of the lap strap 161 of the vehicle seat belt 16 to cause a middle portion 161M of the lap strap 161 of the vehicle seat belt 16 that interconnects the first and second portions to extend along a lateral path in seat belt-receiver cavity 16C as suggested in FIGS. 6 and 7 when pivotable belt clamp 30 occupies the closed belt-trapping position so that the lap strap 161 is retained in a stationary position between foundation 20 and pivotable belt clamp 30.

First side wall 221 of the upwardly extending back 22 of foundation 20 includes first upper strap-receiver channel means 221U for receiving a first portion of the shoulder strap 162 of the vehicle seat belt 16 while a second portion of the shoulder strap 16 is received in the second lower strap-receiver channel means 222L as shown in FIG. 6 this causes a middle portion 162M of the shoulder strap 162 that interconnects the first and second portions of the shoulder strap 16 to extend along a diagonal path through seat belt-receiver cavity 16C as suggested in FIG. 6 when pivotable belt clamp 30 occupies the closed belt-trapping position.

A first side of the upwardly extending back 22 of foundation 20 is formed to include a first upper strap-receiver channel 221U and a first lower strap-receiver channel 221L arranged to lie between the first upper strap-receiver channel 221U and the forwardly extending bottom 21 as shown in FIG. 4. An opposite second side of the upwardly extending back 22 of foundation 20 is formed to include a second upper strap-receiver channel 222U and a second lower strap-receiver channel 222L arranged to lie between the second upper strap-receiver channel 222U and the forwardly extending bottom 21 as shown in FIG. 4. First and second lower strap-receiver channels 221L, 222L are located in a laterally spaced-apart relation to one another to locate a portion of seat belt-receiver cavity 16C therebetween and cooperate to define means for receiving a laterally extending portion of the lap strap 161 included in the vehicle seat belt 16 and arranged to extend through seat belt-receiver cavity 16C to position that laterally extending portion to be trapped between foundation 20 and pivotable belt clamp 30 in a stationary position upon movement of pivotable belt clamp 30 to the closed belt-trapping position. First upper strap-receiver channel 221U and the second lower strap-receiver channels 222L are located in a diagonally spaced-apart relation to one another to locate a portion of seat belt-receiver cavity 16C therebetween and cooperate to define means for receiving a negatively sloping diagonally extending portion of the shoulder strap 162 included in the vehicle seat belt 16 and arranged to extend through seat belt-receiver cavity 16C as suggested in FIG. 6 to position that negatively sloping diagonally extending portion to be trapped between foundation 20 and pivotable belt clamp 30 in a stationary position upon movement of pivotable belt clamp 30 to the closed belt-trapping position as suggested in FIG. 2. Second upper strap-receiver channel 222U and the first lower strap-receiver channel 221L are located in diagonally spaced-apart relation to one another to locate a portion of seat belt-receiver cavity 16C therebetween and cooperate to define means for receiving a positively sloping diagonally extending portion of the shoulder strap 162 included in the vehicle seat belt 16 and arranged to extend through seat belt-receiver cavity 16C to position that positively sloping diagonally extending portion to be trapped between foundation 20 and pivotable belt clamp 30 in a stationary position upon movement of pivotable belt clamp 30 to the closed belt-trapping position.

Each of the first and second lower strap-receiver channels 221L, 222L is T-shaped as suggested in FIG. 4. Each of the first and second upper strap-receiver channels 221U, 222U is inclined relative to the vertical and they are angled and cooperate to form an acute angle therebetween as suggested in FIGS. 4, 8, and 9.

Foundation 20 includes a first side wall 221 formed to include the first lower and upper strap-receiver channels 221L, 221U and a second side wall 222 formed to include the second lower and upper strap-receiver channels 222L, 222U and located in spaced-apart relation to define seat belt-receiver cavity 16C therebetween as suggested in FIG. 4. Foundation 20 also includes a laterally extending panel 223 interconnecting first and second side walls 221, 222 and defining a boundary of seat belt-receiver cavity 16C as shown in FIG. 4.

Seat-support base 10 includes an L-shaped foundation 20 including a first side wall 221 formed to include a T-shaped first lower strap-receiver channel 221L and an angled and inclined first upper strap-receiver channel 221U and a second side wall 222 formed to include a T-shaped second lower strap-receiver channel 222L and an angled and inclined second upper strap-receiver channel 222U as shown, for example, in FIG. 4. First and second side walls 221, 222 are arranged to lie in laterally spaced-apart relation to one another to define therebetween a seat belt-receiver cavity 16C communicating with each of the strap-receiver channels 221L, 221U, 222L, and 222U. Pivotable belt clamp 30 is mounted for movement on foundation 20 about a forward pivot axis 30A from a closed belt-trapping position mating with foundation 20 to trap a portion of a lap strap 161 of a vehicle seat belt 16 passing along a lateral path in sequence through the T-shaped first lower strap-receiver channel 221L, seat belt-receiver cavity 16C, and the T-shaped second lower strap-receiver channel 222L and to trap a portion of a shoulder strap 162 of the vehicle seat belt 16 passing along either one of a first (negatively sloping) diagonal path in sequence through the first upper strap-receiver channel 221U, seat belt-receiver cavity 16C, and the T-shaped second lower strap-receiver channel 222L, or a second (positively sloping) diagonal path in sequence through the second upper strap-receiver channel 222U, seat belt-receiver cavity 16C, and the T-shaped first lower strap-receiver channel 221L, to an opened belt-releasing position away from foundation 20 to release the portions of the lap and shoulder straps 161, 162 trapped in seat belt-receiver cavity 16C to free those straps 161, 162 to be removed from seat belt-receiver cavity 16C and the strap-receiver channels 221L, 221U, 222L, and 222U.

Pivotable belt clamp 30 includes a belt-tensioner plate 32 and a pivot rod 31 as shown in FIG. 4. Belt-tensioner plate 32 is sized to extend into seat belt-receiver cavity 16C to trap the portions of the lap and shoulder straps 161, 162 therein when pivotable belt clamp 30 occupies the closed belt-trapping position as suggested in FIGS. 2 and 5-7. Pivot rod 31 is arranged to extend along the forward pivot axis 30A and coupled to foundation 20 and to belt-tensioner plate 32 to support belt-tensioner plate 32 for pivotable movement about pivot axis 30A to engage and tension lap and shoulder straps 161, 162 extending through seat belt-receiver cavity 16C when pivotable belt clamp 30 occupies the closed belt-trapping position and to disengage and free lap and shoulder straps 161, 162 extending through the seat belt-retainer cavity 16C when pivotable belt clamp 30 occupies the opened belt-releasing position.

Seat mount 40 is coupled to belt-tensioner plate 32 to locate the belt-tension plate 32 between foundation 20 and seat mount 40 when pivotable belt clamp 30 occupies the closed belt-trapping position and the juvenile seat 12 is coupled to seat mount 40 as suggested in FIG. 1. Seat mount 40 is configured to support juvenile seat 12 as shown, for example, in FIG. 3.

Top-end clamp 50 is coupled to a free upper portion 32U of belt-tensioner plate 32 to provide means for engaging a top end 22E of foundation 20 to retain belt-tensioner plate 32 in a stationary position in seat belt-receiver cavity 16C when pivotable belt clamp 30 occupies the closed belt-trapping position as suggested in FIG. 3. Seat mount 40 is configured to support juvenile seat 12 above belt-tensioner plate 32. Seat mount 40 is mounted for movement relative to belt-tensioner plate 32 from a retracted anchor-hiding position to cover and hide top-end clamp 50 anchor from view to an extended anchor-access position to reveal and expose the top-end clamp anchor 50 so that it can be operated by a caregiver to disengage foundation 20 to free pivotable belt clamp 30 to be pivoted from the closed belt-trapping position to the opened belt-releasing position.

The invention claimed is:

1. A child restraint comprising
a juvenile holder including a seat-support base and a juvenile seat configured to the mounted on the seat-support base, the seat-support base including a foundation adapted to set on a passenger seat in a vehicle, a pivotable belt clamp mounted for movement about a forward pivot axis associated with a forward bottom end of the foundation from a closed belt-trapping position in a direction away from a rearward top end of the foundation to an opened belt-receiving position to expose a seat belt-receiver cavity formed in the foundation, a top-end clamp anchor coupled to the pivotable belt clamp to pivot therewith about the forward pivot axis and configured to lock the pivotable belt clamp to the foundation to retain the pivotable belt clamp in the closed belt-trapping position to trap portions of shoulder and lap straps of a vehicle seat belt located in the seat belt-receiver cavity formed in the foundation to tension the shoulder and lap straps included in the vehicle seat belt so that the seat-support base is anchored in a stationary position on the passenger seat, and a seat mount coupled to the pivotable belt clamp to move therewith and oriented to engage and support the juvenile seat in a stationary juvenile-seating position relative to the seat-support base upon pivotable movement of the pivotable belt clamp to the closed belt-trapping position.

2. The child restraint of claim 1, wherein the seat mount is arranged to slide back and forth on the top of the pivotable belt clamp from a retracted anchor-hiding position in which the top-end clamp anchor is hidden from view in a space provided between the pivotable belt clamp and the seat mount to an extended anchor-access position that reveals and exposes the top-end clamp anchor so that it can be accessed and operated by a caregiver during removal of the seat-support base from an anchored stationary position on a passenger seat of a vehicle.

3. The child restraint of claim 2, wherein the seat mount is configured to slide along a curved path relative to the pivotable belt clamp between the retracted anchor-hiding position and the extended anchor-access position.

4. The child restraint of claim 2, wherein the top-end clamp anchor comprises a first pivot blocker mounted on a free upper end of the pivotable belt clamp for lateral movement relative to the pivotable belt clamp to engage and disengage a companion blocker receiver formed in the rearward top end of the foundation.

5. The child restraint of claim 4, wherein the first pivot blocker includes a first retainer pin mounted to move laterally back and forth in a pin-receiver passageway formed in the free upper end of the pivotable belt clamp and arranged to lie in side-by-side communication with the companion blocker receiver formed in the rearward top end of the foundation when the pivotable belt clamp occupies the closed belt-trapping position and a first pin-biasing spring arranged to move the first retainer pin in the pin-receiver passageway of the pivotable belt clamp to extend into the companion blocker receiver of the foundation to retain the pivotable belt clamp in the closed belt-trapping position on the foundation.

6. The child restraint of claim 2, wherein the pivotable belt clamp includes a belt-tensioner plate, a pivot rod coupled to the belt-tensioner plate and to the forward bottom end of the foundation to support the belt-tensioner plate for pivotable movement about the forward pivot axis during movement of the pivotable belt clamp between the closed belt-trapping position and the opened belt-releasing position, and a spring-loaded mount lock coupled to an underside of the seat mount to move therewith and configured to provide means for engaging the belt-tensioner plate to retain the seat mount in the retracted anchor-hiding position and for alternatively disengaging the belt-tensioner plate to free the seat mount to be moved relative to the belt-tensioner plate from the retracted anchor-hiding position to the extended anchor-access position.

7. The child restraint of claim 2, wherein the pivotable belt clamp and seat mount cooperate to form a seat holder that is configured to pivot about the forward pivot axis and the seat mount includes a pull handle that is configured to be gripped and pulled by a caregiver to cause the seat holder to pivot about the forward pivot axis when the top-end clamp anchor is disengaged from the foundation and during movement of the pivotable belt clamp to the opened belt-receiving position.

8. The child restraint of claim 1, wherein foundation is L-shaped and configured to include a forwardly extending bottom that is formed to include a lower portion of the seat belt-receiver cavity and is adapted to set on a vehicle seat bottom and an upwardly extending back that is coupled to a rear portion of the forwardly extending bottom and formed to include an upper portion of the seat belt-receiver cavity and adapted to mate with a vehicle seat back, the forwardly extending bottom includes the forward bottom end that is associated with the forward pivot axis, and the upwardly extending back includes a rearward top end that is arranged to mate with the top-end clamp anchor to retain the pivotable belt clamp in the closed belt-trapping position.

9. The child restraint of claim 8, wherein the forwardly extending bottom is formed to include laterally spaced-apart opposing first and second pivot-rod receivers and the pivotable belt clamp includes a pivot rod arranged to extend laterally along the forward pivot axis and formed to include a first end arranged to extend into the first pivot-rod receiver and an opposite second end arranged to extend into the second pivot-rod receiver.

10. The child restraint of claim 9, wherein the forwardly extending bottom of the foundation includes a first side wall arranged to extend toward the upwardly extending back and second side wall arranged to extend toward the upwardly extending back and lie in laterally spaced-apart relation to the first side wall to define therebetween the lower portion of the seat belt-receiver cavity to receive a lower portion of the pivotable belt clamp therein when the pivotable belt clamp occupies the closed belt-trapping position, and the first side wall is formed to include the first pivot-rod receiver, and the second side wall is formed to include the second pivot-rod receiver.

11. The child restraint of claim 10, wherein the upwardly extending back of the foundation includes first and second side walls arranged to lie in laterally spaced-apart relation to one another to define therebetween the upper portion of the seat belt-receiver cavity to receive an upper portion of the pivotable belt clamp therein and to receive therein portions of shoulder and lap straps of a vehicle seat belt in a space provided between the foundation and the pivotable belt clamp when the pivotable belt clamp occupies the closed belt-trapping position.

12. The child-restraint of claim 11, wherein the first side wall of the upwardly extending back of the foundation includes first lower strap-receiver channel means for receiving a first portion of the lap strap of the vehicle seat belt, the second side wall of the upwardly extending back of the foundation includes second lower strap-receiver channel means for receiving a second portion of the lap strap of the vehicle seat belt to cause a middle portion of the lap strap of the vehicle seat belt that interconnects the first and second portions to extend along a lateral path in the seat belt-receiver cavity when the pivotable belt clamp occupies the closed belt-trapping position so that the lap strap is retained in a stationary position between the foundation and the pivotable belt clamp.

13. The child restraint of claim 11, wherein the first side wall of the upwardly extending back of the foundation includes first upper strap-receiver channel means for receiving a first portion of the shoulder strap of the vehicle seat belt while a second portion of the shoulder strap is received in the second lower strap-receiver channel means to cause a middle portion of the shoulder strap that interconnects the first and second portions of the shoulder strap to extend along a diagonal path through the seat belt-receiver cavity when the pivotable belt clamp occupies the closed belt-trapping position.

14. The child restraint of claim 8, wherein a first side of the upwardly extending back is formed to include a first upper strap-receiver channel and a first lower strap-receiver channel arranged to lie between the first upper strap-receiver channel and the forwardly extending bottom, an opposite second side of the upwardly extending back is formed to include a second upper strap-receiver channel and a second lower strap-receiver channel arranged to lie between the second upper strap-receiver channel and the forwardly extending bottom, the first and second lower strap-receiver channels are located in a spaced-apart relation to one another to locate a portion of the seat belt-receiver cavity therebetween and cooperate to define means for receiving a laterally extending portion of the lap strap included in the vehicle seat belt and arranged to extend through the seat belt-receiver cavity to position that laterally extending portion to be trapped between the foundation and the pivotable belt clamp in a stationary position upon movement of the pivotable belt clamp to the closed belt-trapping position, and the first upper strap-receiver channel and the second lower strap-receiver channels are located in spaced-apart relation to one another to locate a portion of the seat belt-receiver cavity therebetween and cooperate to define means for receiving a diagonally extending portion of the shoulder strap included in the vehicle seat belt and arranged to extend through the seat belt-receiver cavity to position that diagonally extending portion to be trapped between the foundation and the pivotable belt clamp in a stationary position upon movement of the pivotable belt clamp to the closed belt-trapping position.

15. The child restraint of claim 14, wherein the second upper strap-receiver channel and the first lower strap-receiver channels are located in spaced-apart relation to one another to locate a portion of the seat belt-receiver cavity therebetween and cooperate to define means for receiving a diagonally extending portion of the shoulder strap included in the vehicle seat belt and arranged to extend through the seat belt-receiver cavity to position that diagonally extending portion to be trapped between the foundation and the pivotable belt clamp in a stationary position upon movement of the pivotable belt clamp to the closed belt-trapping position.

16. The child restraint of claim 14, wherein each of the first and second lower strap-receiver channels is T-shaped.

17. The child restraint of claim 14, wherein each of the first and second upper strap-receiver channels is inclined relative to the vertical and they are angled and cooperate to form an acute angle therebetween.

18. The child restraint of claim 14, wherein the foundation includes a first side wall formed to include the first lower and upper strap-receiver channels, a second side wall formed to include the second lower and upper strap-receiver channels and located in spaced-apart relation to define the seat belt-receiver cavity therebetween and a laterally extending panel interconnecting the first and second side walls and defining a boundary of the seat belt-receiver cavity.

19. A child restraint comprising
a juvenile seat,
a seat-support base including an L-shaped foundation including a first side wall formed to include a T-shaped first lower strap-receiver channel and an angled and inclined first upper strap-receiver channel and a second side wall formed to include a T-shaped second lower strap-receiver channel and an angled and inclined second upper strap-receiver channel, the first and second side walls being arranged to lie in laterally spaced-apart relation to one another to define therebetween a seat belt-receiver cavity communicating with each of the strap-receiver channels, and a pivotable belt clamp mounted for movement about a forward pivot axis from a closed belt-trapping position mating with the L-shaped foundation to trap a portion of a lap strap of a vehicle seat belt passing along a lateral path in sequence through the T-shaped first lower strap-receiver channel, the seat belt-receiver cavity, and the T-shaped second lower strap-receiver channel and to trap a portion of a shoulder strap of the vehicle seat belt passing along one of a first diagonal path in sequence through the first upper strap-receiver channel, the seat belt-receiver cavity, and the T-shaped second lower strap-receiver channel, and a second diagonal path in sequence through the second upper strap-receiver channel, the seat belt-receiver cavity, and the T-shaped first lower strap-receiver channel, to an opened belt-releasing position away from the L-shaped foundation to release the portions of the lap and shoulder straps trapped in the seat belt-receiver cavity to free those straps to be removed from the seat belt-receiver cavity and the strap-receiver channels.

20. The child restraint of claim 19, wherein the pivotable belt clamp includes a belt-tensioner plate sized to extend into the seat belt-receiver cavity to trap the portions of the lap and shoulder straps therein when the pivotable belt clamp occupies the closed belt-trapping position and a pivot rod arranged to extend along the forward pivot axis and coupled to the L-shaped foundation and to the belt-tensioner plate to support the belt-tensioner plate for pivotable movement to engage and tension lap and shoulder straps extending through the seat belt-receiver cavity when the pivotable belt clamp occupies the closed belt-trapping position and disengage and free lap and shoulder straps extending through the seat belt-retainer cavity when the pivotable belt clamp occupies the opened belt-releasing position.

21. The child restraint of claim 20, further comprising a seat mount coupled to the belt-tensioner plate to locate the belt-tension plate between the L-shaped foundation and the seat mount when the pivotable belt clamp occupies the closed belt-trapping position and the juvenile seat is coupled to the seat mount.

22. The child restraint of claim 20, further comprising a top-end clamp coupled to a free upper portion of the belt-tensioner plate to provide means for engaging a top end of the L-shaped foundation to retain the belt-tensioner plate in a stationary position in the seat belt-receiver cavity when the pivotable belt clamp occupies the closed belt-trapping position.

23. The child restraint of claim 22, further comprising a seat mount configured to support the juvenile seat above the belt-tensioner plate and mounted for movement relative to the belt-tensioner plate from a retracted anchor-hiding position to cover and hide the top-end clamp anchor from view to an extended anchor-access position to reveal and expose the top-end clamp anchor so that it can be operated by a caregiver to disengage the L-shaped foundation to free the pivotable belt clamp to be pivoted from the closed belt-trapping position to the opened belt-releasing position.

\* \* \* \* \*